(12) United States Patent
Ionescu et al.

(10) Patent No.: US 9,591,484 B2
(45) Date of Patent: Mar. 7, 2017

(54) SECURE ENVIRONMENT FOR SUBSCRIBER DEVICE

(71) Applicant: T-Mobile USA, Inc., Bellevue, WA (US)

(72) Inventors: Alexandru Catalin Ionescu, Seattle, WA (US); Arturo Silis, Newcastle, WA (US); Raymond Froelich, Redmond, WA (US); Adrian Buzescu, Bellevue, WA (US); Ahmad Arash Obaidi, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 566 days.

(21) Appl. No.: 13/839,189

(22) Filed: Mar. 15, 2013

(65) Prior Publication Data
US 2013/0281058 A1 Oct. 24, 2013

Related U.S. Application Data

(60) Provisional application No. 61/636,499, filed on Apr. 20, 2012, provisional application No. 61/649,546, (Continued)

(51) Int. Cl.
*H04W 12/08* (2009.01)
*H04W 12/12* (2009.01)
(Continued)

(52) U.S. Cl.
CPC .......... *H04W 12/08* (2013.01); *G06F 9/4406* (2013.01); *G06F 21/31* (2013.01); *G06F 21/44* (2013.01);
(Continued)

(58) Field of Classification Search
CPC ..... H04W 88/02; H04W 12/12; H04W 12/08; H04W 12/06; H04W 12/02; H04L 63/08
(Continued)

(56) References Cited

U.S. PATENT DOCUMENTS 6,226,749 B1   5/2001   Carloganu et al.
6,317,836 B1   11/2001  Goren et al.
(Continued)

FOREIGN PATENT DOCUMENTS

CN   101398872       4/2009
EP   1359733 A1    11/2003
(Continued)

OTHER PUBLICATIONS

PCT Search Report and Written Opinion mailed Jul. 30, 2013 for PCT Application No. PCT/US13/37332, 13 pages.
(Continued)

*Primary Examiner* — Marisol Figueroa
(74) *Attorney, Agent, or Firm* — Lee & Hayes, PLLC (57) ABSTRACT

A secure operating environment for a telecommunication device is disclosed, where a trusted execution environment (TEE) can establish both first secure communication (SC) channel between the TEE and a security-enabled SIM card, and a second SC between a service provider entity and Trustlet application, which is a component of the TEE of the telecommunication device. The telecommunication device may include a processor(s), an identification module, and a memory including the TEE and a normal operating environment (NOE). The TEE can be operated by the one or more processors to establish the first SC channel, authenticate a service identifier of the identification module, and establish the second SC channel, prior to an execution of the NOE.

20 Claims, 7 Drawing Sheets

Related U.S. Application Data filed on May 10, 2012, provisional application No. 61/684,683, filed on Aug. 17, 2012.

(51) Int. Cl.

| | | |
|---|---|---|
| *H04L 9/28* | (2006.01) | |
| *H04W 12/06* | (2009.01) | |
| *G06F 21/57* | (2013.01) | |
| *G06F 21/44* | (2013.01) | |
| *G06F 9/44* | (2006.01) | |
| *G06F 21/31* | (2013.01) | |
| *G06F 21/51* | (2013.01) | |
| *G06F 21/88* | (2013.01) | |
| *H04L 29/06* | (2006.01) | |

(52) U.S. Cl.
CPC ............ *G06F 21/51* (2013.01); *G06F 21/575* (2013.01); *G06F 21/88* (2013.01); *H04L 9/28* (2013.01); *H04W 12/06* (2013.01); *H04W 12/12* (2013.01); *H04L 63/0823* (2013.01); *H04L 63/102* (2013.01)

(58) Field of Classification Search
USPC .......................... 455/410, 411; 380/259, 270
See application file for complete search history.

(56) References Cited

U.S. PATENT DOCUMENTS

| | | | |
|---|---|---|---|
| 6,321,079 B1 | 11/2001 | Cooper | |
| 6,327,660 B1* | 12/2001 | Patel | 713/193 |
| 7,689,204 B2 | 3/2010 | Dupuis et al. | |
| 2005/0172135 A1 | 8/2005 | Wiersma | |
| 2006/0075259 A1* | 4/2006 | Bajikar et al. | 713/189 |
| 2007/0154014 A1* | 7/2007 | Aissi et al. | 380/249 |
| 2007/0180269 A1 | 8/2007 | Irish et al. | |
| 2007/0264990 A1 | 11/2007 | Droste et al. | |
| 2008/0090614 A1 | 4/2008 | Sicher et al. | |
| 2008/0132226 A1 | 6/2008 | Carnall | |
| 2008/0209206 A1 | 8/2008 | Vaha-Sipila et al. | |
| 2008/0229092 A1 | 9/2008 | Dale et al. | |
| 2008/0282084 A1 | 11/2008 | Hatakeyama | |
| 2008/0307494 A1* | 12/2008 | Holtzman | G06F 21/10 726/2 |
| 2009/0083858 A1 | 3/2009 | Jennings et al. | |
| 2009/0158419 A1 | 6/2009 | Boyce | |
| 2009/0165119 A1 | 6/2009 | Ramanath | |
| 2009/0270126 A1 | 10/2009 | Liu | |
| 2009/0325646 A1 | 12/2009 | Stewart et al. | |
| 2010/0082968 A1 | 4/2010 | Beverly | |
| 2010/0263043 A1 | 10/2010 | Xu | |
| 2010/0273452 A1 | 10/2010 | Rajann et al. | |
| 2010/0299744 A1* | 11/2010 | Mardiks | G06F 21/10 726/17 |
| 2011/0076986 A1 | 3/2011 | Glendinning et al. | |
| 2011/0081889 A1 | 4/2011 | Gao et al. | |
| 2011/0130117 A1 | 6/2011 | Fan et al. | |
| 2011/0130118 A1 | 6/2011 | Fan et al. | |
| 2011/0159843 A1 | 6/2011 | Heath et al. | |
| 2011/0307711 A1 | 12/2011 | Novak et al. | |
| 2012/0042376 A1 | 2/2012 | Dolgunov et al. | |
| 2012/0058743 A1 | 3/2012 | Chen | |
| 2012/0083242 A1* | 4/2012 | Spitz | H04L 63/08 455/406 |
| 2012/0101941 A1 | 4/2012 | Kang et al. | |
| 2013/0304616 A1 | 11/2013 | Raleigh et al. | |
| 2014/0057597 A1 | 2/2014 | Velusamy et al. | |
| 2016/0029220 A1 | 1/2016 | Obaidi | |

FOREIGN PATENT DOCUMENTS

| | | |
|---|---|---|
| EP | 2063378 | 5/2009 |
| WO | WO2004063871 A2 | 7/2004 |
| WO | WO2008077628 A2 | 7/2008 |
| WO | WO2013158977 A1 | 10/2013 |

OTHER PUBLICATIONS

Office action for U.S. Appl. 13/840,045, mailed on Jul. 30, 2014, Buzescu et al., "Remote Unlocking of Telecommunication Device Functionality", 11 pages.
Office action for U.S. Appl. 13/660,350, mailed on Aug. 7, 2014, Froelich et al., "Mobile Device-Type Locking", 8 pages.
PCT Search Report and Written Opinion mailed Sep. 17, 2013 for PCT Application No. PCT/US13/37381, 11 pages.
Lee, et al., "A New Delegation-Based Authentication Protocol for Use in Portable Communication Systems", IEEE Transactions on Wireless Communications, vol. 4, No. 1, Jan. 2005, pp. 57-64.
Office Action for U.S. Appl. No. 13/660,350, mailed on Jul. 22, 2013, Obaidi, "Mobile Device-Type Locking", 8 pages.
PCT Search Report and Written Opinion mailed Jul. 1, 2013 for PCT Application No. PCT/US13/37345, 10 pages.
Final Office Action for U.S. Appl. No. 13/660,350, mailed on Jan. 13, 2014, Ahmad Arash Obaidi, "Mobile Device-Type Locking", 8 pages.
Final Office Action for U.S. Appl. No. 13/840,045, mailed on Nov. 17, 2014, Adrian Buzescu, "Remote Unlocking of Telecommunication Device Functionality", 12 pages.
PCT Search Report and Written Opinion mailed Jan. 17, 2013 for PCT Application No. PCT/US12/62050, 10 pages.
Extended European Search Report mailed May 20, 2015 for European Patent Application No. 12843678.9, 8 pages.
Extended European Search Report mailed Nov. 11, 2015 for European patent application No. 1377892238, 6 pages.
Office action for U.S. Appl. No. 13/840,045, mailed on Jul. 29, 2015, Buzescu et al., "Remote Unlocking of Telecommunication Device Functionality", 10 pages.
Chinese Office Action mailed Feb. 26, 2016 for Chinese patent application No. 201280053062.8, a counterpart foreign application of US patent No. 9,055,443.
Extended European Search Report mailed Nov. 27, 2015 for European patent application No. 13778691.9, 9 pages.
Office action for U.S. Appl. No. 13/796,550, mailed on Jan. 11, 2016, Velusamy et al., "SIM Level Mobile Security", 20 pages.
Office Action for U.S. Appl. No. 14/874,023, Obaidi, mailed on Dec. 21, 2015, 7 pages.
Office Action for U.S. Appl. No. 13/796,550, mailed on Jan. 26, 2015, Senthil Kumar Mulluppadi Velusamy, "SIM Level Mobile Security", 18 pages.
Office Action for U.S. Appl. No. 13/842,116, mailed on Jan. 27, 2015, Ahmad Arash Obaidi, "Secure Lock for Mobile Device", 7 pages.
Final Office Action for U.S. Appl. No. 13/796,550, mailed on May 13, 2015, Senthil Kumar Mulluppadi Velusamy, "SIM Level Mobile Security", 18 pages.
Final Office Action for U.S. Appl. No. 13/796,550, mailed on May 23, 2016, Senthil Kumar Mulluppadi Velusamy, "SIM Level Mobile Security", 22 pages.
Office action for U.S. Appl. No. 13/796,550, mailed on Nov. 10, 2016, Velusamy et al., "SIM Level Mobile Security", 23 pages.

\* cited by examiner

SECURE ENVIRONMENT FOR SUBSCRIBER DEVICE

CROSS REFERENCE TO RELATED PATENT APPLICATIONS

This patent application claims priority filing benefit from U.S. Provisional Patent Application Nos. 61/636,499, filed Apr. 20, 2012, 61/645,546, filed May 10, 2012, and 61/684,683, filed Aug. 17, 2012, which are hereby incorporated by reference herein, in their entirety.

BACKGROUND

Modern telecommunication service providers generate much of their revenue by selling propriety wireless communication services and devices to their customers, under the good-faith assumption that these services and devices will be utilized in accordance with their intended purposes. For example, a particular telecommunication service provider may allow access to its wireless communication services by selling customers a prepaid or a postpaid, i.e., subscription-based, rate plan, which is generally associated with a respective customer's service level agreement. A telecommunication service provider can also require its customers to purchase corresponding, provider-specific communication devices, including cellular phones, personal digital assistants, tablet computers, and the like, in order to access its proprietary communication services.

Further, telecommunication service providers and mobile device manufacturers enter into lucrative business agreements that contractually bind select manufacturers' products to a particular service provider. In practice, these agreements are based on many important real-world considerations, including a service provider's customer-base, existing market share, forecast device sales, amongst many other factors. However, these mutually beneficial business relationships can be negatively impacted by customer deviations from both expected service usage and retail device purchases. Accordingly, it is important for service providers and affiliated device manufactures to collaborate with each other, in order to ensure that both contracting parties are able to achieve their independent and collective business objectives, in view of these types of consumer anomalies.

Adding to the problem of unanticipated customer deviations, many tech-savvy consumers have contrived new ways to frustrate the business and marketing objectives of both telecommunication service providers and device manufacturers, by employing both software and hardware workarounds or hacks, which enable them to gain unauthorized access to telecommunication services and devices. This subset of consumers has been able to bypass security measures employed in proprietary communication devices of an affiliated telecommunication service provider, as well as to acquire unaffiliated, generic/unlocked devices, to avoid purchasing services and products from their respective telecommunication service provider.

For example, some telecommunication device users execute unauthorized software to breach certain security features of their respective device, in order to gain root-level access to their device's operating system (OS). Achieving this OS-level access allows a user to download additional applications, extensions, and themes that are not approved by the device's authorized service provider and/or media content provider(s). This misuse of a carrier-locked communication device is sometimes referred to in the industry as "jail-breaking" a device, and it can allow an unlocked, jail-broken device to gain access to unauthorized services of multiple telecommunication service providers.

Another example of a common hardware hack that has been employed by some telecommunication device users is to purchase an after-market product known as a "SIM-shim," which is a thin circuit board that is designed to fit between a service provider's Subscriber Identity Module (SIM) card and a telecommunication device's SIM socket. The SIM-shim device can be employed to allow a user to unlock his or her carrier-locked device, by simply inserting this add-on component into his or her device, thereby effectuating an override of device security features intended to keep the device restricted to services of a specific telecommunication service provider.

As would be understood by those skilled in the art, SIM cards enable a telecommunication service subscriber to be identified on a corresponding service provider's network by storing a unique International Mobile Subscriber Identity (IMSI) that can be retrieved and subsequently authenticated over-the-air by a corresponding service provider, each time a user device engages in communications with its telecommunication service provider. A SIM IMSI generally includes the following information: a Mobile Country Code (MCC), a Mobile Network Code (MNC), and a Mobile Subscriber Identification Number (MSIN). This information allows a user's provider-issued SIM card to be identified, registered, and authenticated with an issuing telecommunication service provider.

Modern SIM cards are sold "as is," meaning they are both static and rate plan specific, as their IMSI data cannot be modified after issuance. For this reason, each time a customer purchases a new telecommunication device or a new service plan offering from its service provider, the customer may be issued a different SIM card that must be added to the customer's existing user account at the service provider. Additionally, most SIM cards typically comprise only enough on-device memory to store static IMSI data along with minimal user contact information, such as a small number of important subscriber contact phone numbers.

Accordingly, there is an opportunity to improve upon security measures employed to protect against unauthorized usage of both proprietary telecommunication services and proprietary telecommunication devices. Additionally, there is also an opportunity for telecommunication service providers to be able to better monitor and manage customer access to, and usage of, its valuable network resources.

BRIEF DESCRIPTION OF THE DRAWINGS

The Detailed Description is set forth with reference to the accompanying figures.

DETAILED DESCRIPTION

This disclosure describes various subscriber device security measures that can be employed by a telecommunication service provider to ensure that only authorized users and authorized communication devices gain access to its proprietary telecommunication services and network resources. These device security measures, which are described further herein, can prevent tech-savvy consumers from circumventing or otherwise defeating well-known network access safeguards with simple software hacks or after-market hardware implements that are designed to overcome proprietary communication device security features. It should be understood that although the disclosure describes several examples and related embodiments, the disclosure is not intended to be all-inclusive nor exhaustive in its descriptions. As such, it should be appreciated that the related subject matter of the disclosure can be reasonably modified, rearranged, or otherwise altered, to achieve similar results, without departing from the spirit and scope of the invention, as claimed.

Today, most wireless communication devices that are affiliated with a particular telecommunication service provider, such as smart phones, tablet devices, electronic-book devices, media player devices, and like, are issued with unique identification modules, e.g., subscriber identification modules or SIM cards, by a corresponding service provider. These identification modules allow wireless devices to be registered on a respective service provider's telecommunication network, such that the devices can thereafter communicate and transfer data over the telecommunication network, without having to re-register their device in order to facilitate subsequent communication sessions. Ensuing communication sessions for a registered device may be initiated after a service provider authenticates identification information stored in the user device's identification module.

Figure 1:
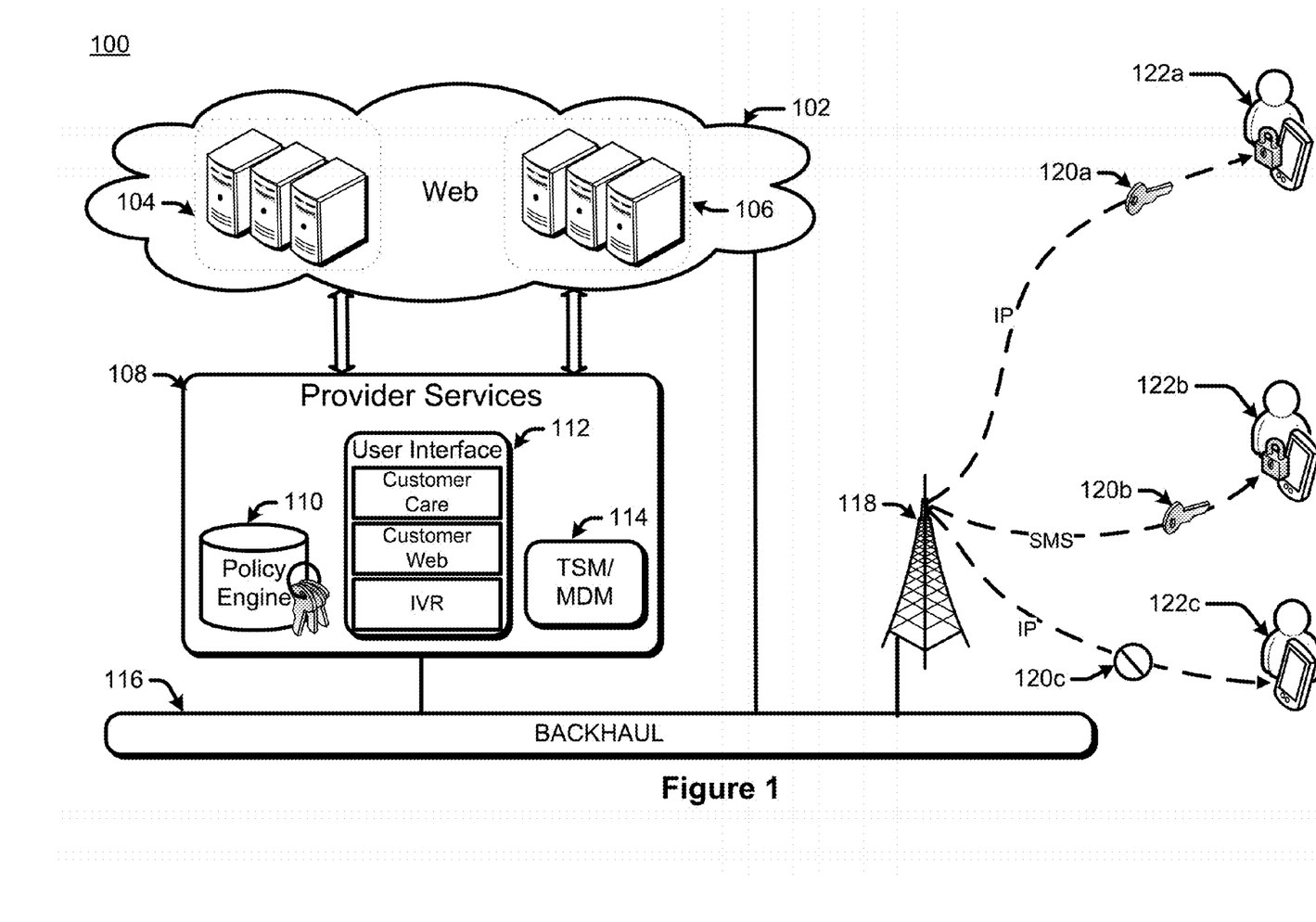
FIG. 1 is a top level diagram illustrating an example provider services entity for authenticating access to telecommunication network services, based on provisioned service plan identifications, in accordance with embodiments of the disclosure.

FIG. 1 depicts a telecommunication system/network 100, in accordance with various implementations of the disclosure. The telecommunication system 100 includes, but is not limited to, a provider services entity 108 in communication with multiple affiliated network servers, 104 and 108, and one or more network base stations 118, via portions of a network backhaul 116 and/or via other distributed portions of the network (not shown), respectively having connectivity to the world-wide web 102. Further, system 100 includes an over-the-air (OTA) interface that facilitates radio communications, e.g., wireless IP data and SMS communications 120a-c, and the like, between the provider services entity 108 and one or more user telecommunication devices 122a-c, via a network base station 118.

It should be appreciated that telecommunication system 100 of FIG. 1 is intended to depict a simplified representation of a telecommunication network that can employ any mixture of 2G, 3G, and 4G access technologies, which are commonly utilized in a real-world, heterogeneous telecommunication network deployments. These diverse communication technologies and alternative network topologies are neither depicted nor described within the context of the telecommunication system 100 of FIG. 1, for the sake of brevity.

However, it should be understood that the user devices 122a-c may be representative of any number common wireless communication devices, including cellular phones, tablet computers, electronic book devices, handheld gaming units, personal media players, etc., which can be connected to the telecommunication network 100 utilizing one or more wireless base stations 118, or any other common wireless or wireline network access technology. Further, the user communication devices 122a-c may be configured to run any known operating system, including but not limited to, Microsoft Windows Mobile®, Google Android®, Apple iOS®, Linux Mobile®, or any other common mobile device operating system.

It should also be appreciated that the telecommunication system 100 could be configured to employ any combination of common wireless broadband communication technologies, including, but not limited to, Long Term Evolution (LTE)/LTE Advanced technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, or WiFi® technology. Further, the backhaul portion 116 of the telecommunication network 100 may be configured to employ any common wireline communication technology, including but not limited to, optical fiber, coaxial cable, twisted pair cable, Ethernet cable, and power-line cable, along with any common wireless communication technology, such as those described above.

In an implementation, the provider services entity 108 may include, but is not limited to, the following elements: a policy engine component 110, a user interface (UI) component 112, and a trusted service manager/mobile device management (TSM/MDM) component 114. In a scenario where a particular user device has been locked, 122a-b, a user can be proactive in remedying this problem, by contacting its telecommunication service provider and interacting with its provider services entity 108 via select UI tools of its UI component 112. One of these UI tools of the UI component 112 can be a traditional customer care center that allows a user of a blocked communication device 122a to call in and speak directly with a customer service representative of its telecommunication service provider, in an attempt to have their device remotely unlocked 102a over-the-air (OTA).

Another UI tool of the UI component 112 may be a customer web interface that allows a user of a locked device 122b to utilize a dedicated customer account webpage (not shown) of a corresponding service provider website, to perform various user-driven account management functions. In one implementation, a user-driven account management function of a customer's account webpage can facilitate a user unlocking their communication device 122b over the Internet/Web 102, when authorized to do so by their telecommunication service provider. By way of example, this particular scenario may occur when a subscriber decides to pay a past due monthly service fee online, i.e., by credit card, using a secure online payment system of the service provider's website to initiate an unlock action 120b for their user device 122b. An additional UI tool of the UI component 112 may be an Interactive Voice Recorded (IVR) system, which allows a user to call a phone number associated with the IVR system and then follow pre-recorded voice instructions/prompts to attempt to unlock their communication device, in a similar manner to the other UI tool routines described above.

The policy engine component 110 of the provider services entity 108 can advantageously maintain user account information, as well as service provider policy rules within a resident or distributed service provider data store, to enable customer accounts and affiliated customer communication devices 122a-c to be managed by a corresponding telecommunication service provider using the provider services entity 108. In various scenarios, a particular service provider may also elect to enforce preferred service policy rules via its policy engine 110, in such a manner as to facilitate any of the above UI unlocking schemes with its UI component 112 tools. In addition, a service provider can also employ these same UI tools to facilitate its customer accounts/ service representatives and/or its telecommunication service customers being able to lock or unlock specific communication devices, as well as block or unblock access to select communication services, in accordance with preferred service provider access rules.

In an embodiment, the provider services entity's 108 policy engine 110 may collaborate with its TSM/MDM component(s) 114 and/or its user interface component 112, as necessary, to carry out various device unlocking and locking procedures, as well as various access blocking and unblocking processes, in accordance with preferred access policies of an associated telecommunication service provider. By way of example, in a scenario where a user communication device 122c is either reported as being lost or stolen, the provider services entity 108 may interact with a local or networked equipment identity register (EIR) server 106, to identify the compromised device 120c, and then block or "brick" access 120c to the device 122c, in accordance with associated EIR policies that are accessible by the policy engine 110.

In another embodiment, the provider services entity's 108 policy engine 110 may interface with its TSM/MDM component 114 and/or its user interface component 112, to carry out various device unlocking and locking procedures, as well as various access blocking and unblocking processes, in accordance with preferred accounting and payment policies of an associated telecommunication service provider. For example, in a scenario where a customer account, associated with a particular user communication device 122c, is past due or when a prepaid service has expired, the provider services entity 108 may interact with a local or networked equipment identity payment (EIP) server 104, to identify a device 120c associated with the delinquent customer account, and then block or "brick" access 120c to the device 122c, in accordance with associated EIP policies that are accessible by the policy engine 110.

In various implementations, the TSM/MDM component 114 of the provider services entity 108 may communicate device unlocking triggers 12a-b or service blocking triggers 120c to the communication devices 122a-c using short messaging service (SMS) messages, i.e., via a short messaging service center (SMSC), Internet Protocol (IP) messages, i.e., via gateway GPRS and/or serving GPRS support nodes (GGSNs or SGSNs), or by any other common messaging protocol. It should be understood that a particular messaging protocol employed by a service provider to send corresponding unlocking, locking, unblocking, and/or blocking triggers, can be determined and/or selected ahead of time, or dynamically, based on existing network infrastructure constraints and/or various determined network communication states, such as network states associated with communications resource capacity, congestion, interference, etc.

Figure 2:
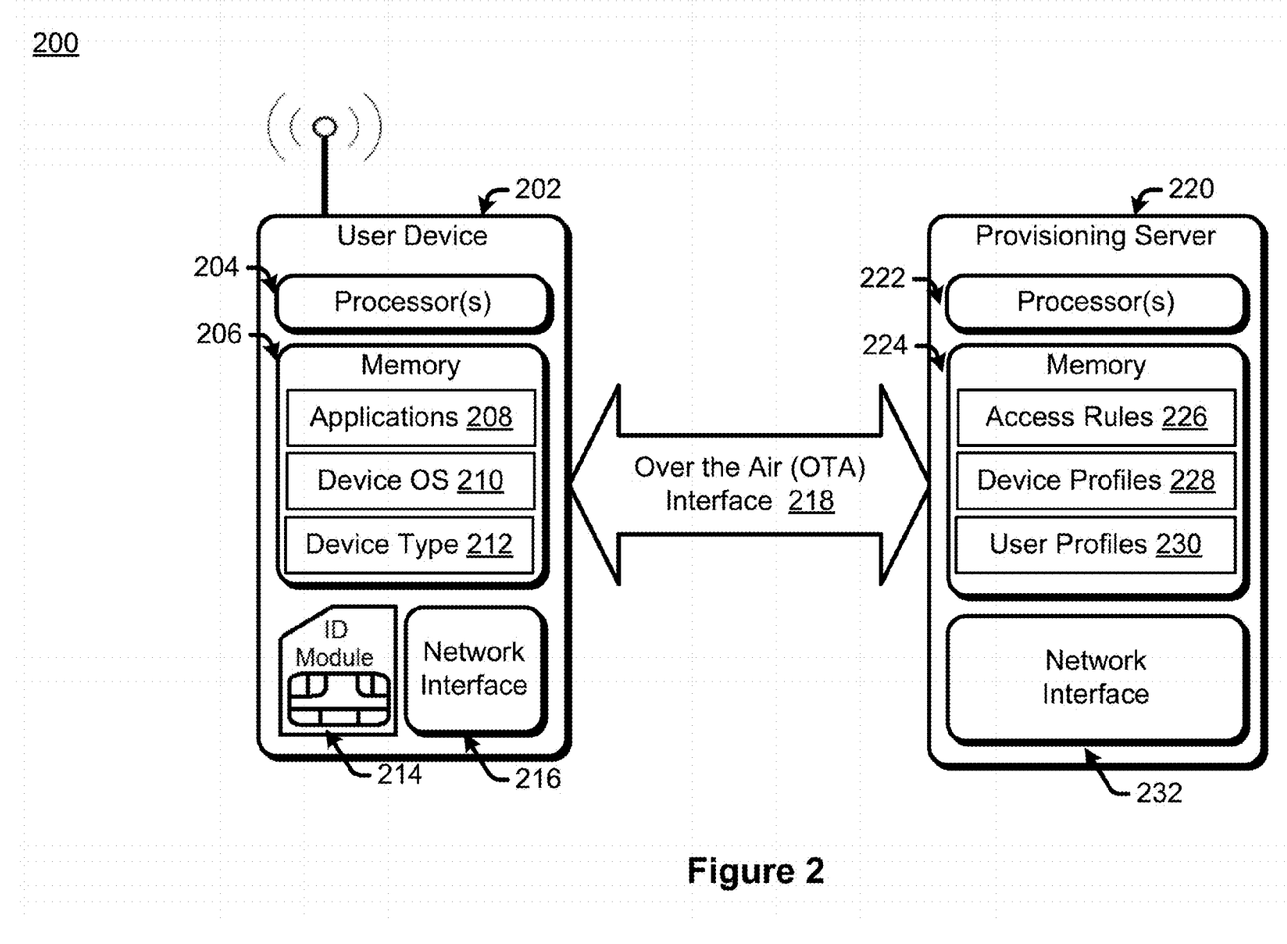
FIG. 2 is an example hardware platform employed in over-the-air (OTA) provisioning of service identification information, in accordance with embodiments of the disclosure.

FIG. 2 depicts a multi-device hardware platform 200 employed during an OTA interface 218 provisioning procedure, where a user device 202 is in communication with a service provider device, designated as a provisioning server 220. The user device 202 may be representative of any of the communication devices 122a-c of FIG. 1, and the provisioning server 220 may be representative of the provider services entity 108, of in FIG. 1. In an embodiment, the user device 202 may include, but is not limited to, one or more processor(s) 204, a memory 206 storing various software applications 208, a device operating system (OS) 210, as well as a device type identifier 212, an identification module 214, and a network interface 216.

Although not explicitly depicted in FIG. 2, each of the one or more processor(s) 204, can include at least a central processing unit (CPU) having numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 204 may also be responsible for executing all computer applications 208 stored in the user device's 202 memory 206, which can be associated with common types of volatile (RAM) and/or nonvolatile (ROM) memory.

The device type identifier 212 (e.g., such as an international mobile equipment identity or IMEI) of the user device 202 may be associated with an indication of a particular device model and serial number, as well as a particular telecommunication service provider and/or an associated service/rate plan. In an embodiment, the device type identifier 212 can indicate the device 202 as being associated with either a prepaid rate plan or a postpaid rate plan of a particular telecommunication service provider. In this way, the user device 202 can be sold for a particular purpose, such as a low-cost prepaid phone, and its corresponding device type identifier 212 can designate the device as being intended for this purpose, independent from any service identifier indications of the device's 202 ID module 214.

In some scenarios, the ID module 214 of the user device 202 can indicate a customer account, maintained by a service provider entity, as being associated with a particular rate plan type of a telecommunication service provider (e.g., corresponding to a particular international mobile subscriber identity or IMSI). Customer rate plans may be associated with either prepaid rate plans or a postpaid, subscription-based rate plans.

In various implementations, a rate plan associated with the device type identifier 212 may be the same as, or different from, a rate plan type associated with a service identifier of the ID module 214. Additionally, a telecommunication service provider associated with the device type identifier 212 may be the same as, or different from, a telecommunication service provider associated with a service identifier of the ID module 214. Further, the network interface 216 of the user device 202 may include one or more device transceivers, and optionally, one or more device transcoders, such that the user device 202 can communicate (transmit and receive) data between itself and the provisioning server 220 of its telecommunication service provider via the OTA interface 218.

In an embodiment, the provisioning server 220 of an affiliated telecommunication service provider may include, but is not limited to, one or more processor(s) 222, a memory 224 storing sets of service provider access rules 226, proprietary user device profiles 210, as well as user/subscriber profiles 230, and a network interface 216 enabling the provisioning server 220 to communicate with one or more user device(s) 202 using the OTA interface 218.

Each of the one or more processor(s) 222 of the provisioning server 220 may include a CPU having numerous ALUs that perform arithmetic and logical operations, as well as one or more CUs that extract instructions and stored content from processor cache memory and then executes these instructions by calling on the ALUs, as necessary, during program execution. The processor(s) 222 may also responsible for executing all computer programs, and retrieving all data, stored in the server's 220 memory 224, which may be associated with any common type of volatile (RAM) and/or nonvolatile (ROM) memory.

In an embodiment the access rules 226 stored in the memory 224 of the provisioning server 220 may correspond to the above-mentioned policy rules associated with the policy engine component 110 of the provider services entity 108. The device profiles 228 may correspond to data associated with the device type identifiers 212 for proprietary user devices 202 sold by a particular telecommunication service provider. In this way, a service provider can maintain profiles for its customers' devices 202, which indicate a respective user device's identification information and intended purpose. Additionally, the user profiles 230 may correspond to data associated with the ID module 214 of the user device 202. Accordingly, the user profiles 230 can contain customer account information maintained by a telecommunication service provider, including, but not limited to, customer identification information and customer rate plan data.

Figure 3:
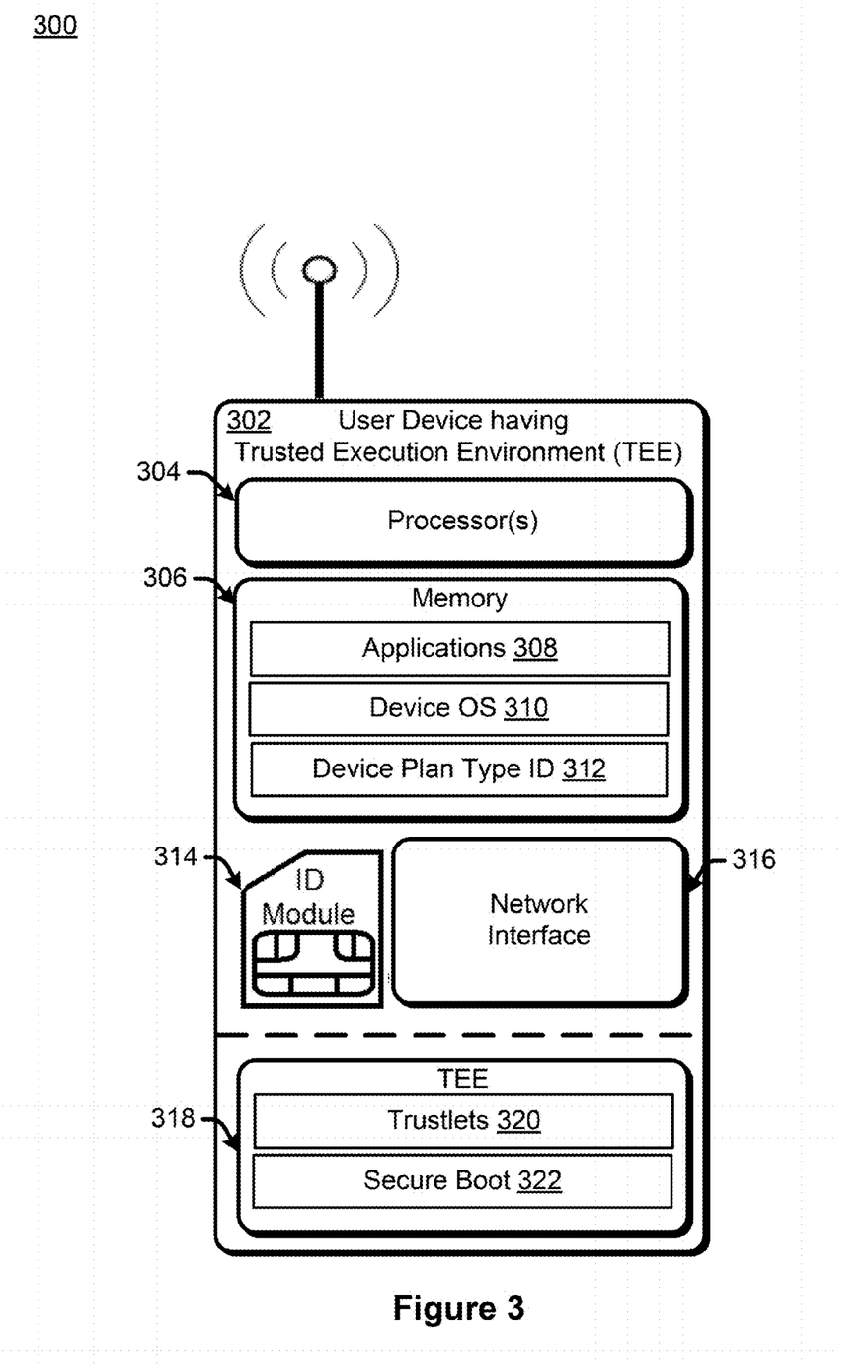
FIG. 3 is an example hardware platform of a user communication device having a trusted execution environment (TEE) partition, in accordance with embodiments of the disclosure.

FIG. 3 depicts a hardware platform 300 of a user device 302 having a trusted execution environment (TEE) partition 318, in accordance with various embodiments of the disclosure. Similar to that which was discussed above for the user device 202 of FIG. 2, the user device with the TEE 300 of FIG. 3, may be representative of any of the communication devices 122a-c of FIG. 1. In an embodiment, the user device 302 may include, but is not limited to, one or more processor(s) 304, a memory 306 storing various software applications 308, a device operating system (OS) 310, as well as a device plan type identifier 312, an identification module 314, a network interface 316, and a TEE partition 318 storing secure Trustlet applications 320 and secure boot processes 322.

It should be understood that most of the user device 302 components of FIG. 3, i.e., those associated with reference numbers 304, 306, 308, 310, 312, 314, and 316, are analogous in function to corresponding user device 202 components of FIG. 2, i.e., those associated with reference numbers 204, 206, 208, 210, 212, 214, and 216, as described above. As such, the above description for the components of user device 202, also applies to the similarly-referenced device components of the user device with the TEE 302, with the exception of the TEE partition 318 portion of user device 302.

In various implementations, the TEE partition 318 may be stored in user device's 302 memory 306, or alternatively, within a separate, dedicated TEE memory (not shown). Similarly, the TEE partition 318 may also be configured to operate with a dedicated TEE processor (not shown) and/or with a dedicated TEE OS (not shown), which can allow the TEE partition 318 to operate independent from the user device's 302 main hardware components, including both its processor(s) 304 and memory 306. This dedicated TEE hardware scenario may be particularly beneficial during boot executions, to prevent any unauthorized access of the TEE partition 318. Further, in an exemplary implementation, the TEE partition 318 may also be configured to operate independent of the device operating system (OS) 310. As such, the TEE's secure Trustlet applications 320 and Boot processes 322 may be safely executed before and/or during concurrent executions of the device OS 310, without any requisite OS-level data sharing that could potentially corrupt the TEE partition 318.

Figure 5:
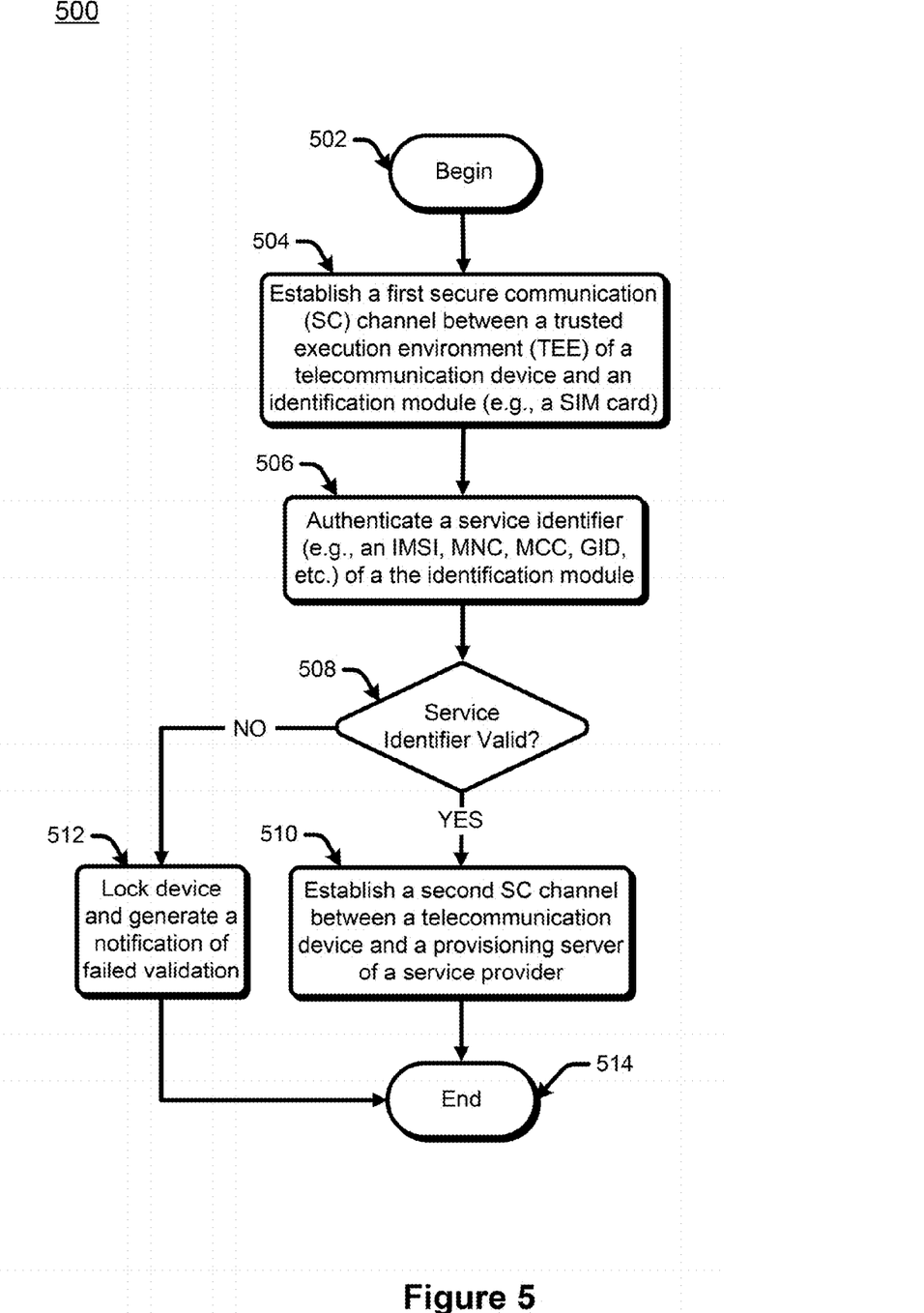
FIG. 5 is a flow chart of an example process for establishing a first secure communication connection between a trusted execution environment (TEE) and an identity module, and second secure communication connection between a telecommunication device and a provisioning service provider, in accordance with embodiments of the disclosure.
Figure 6:
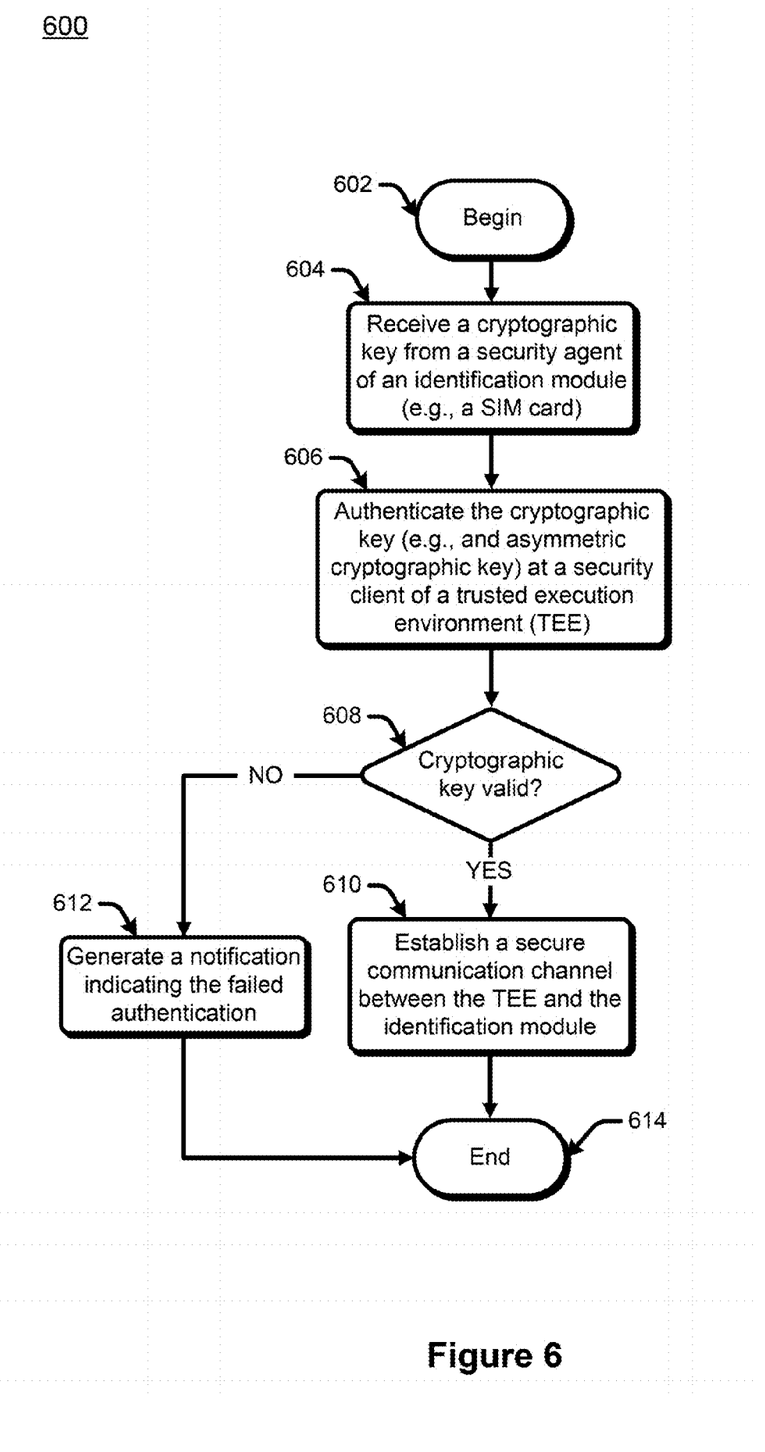
FIG. 6 is a flow chart of an example process for establishing a secure communication connection between a trusted execution environment (TEE) and an identity module, in accordance with embodiments of the disclosure.
Figure 7:
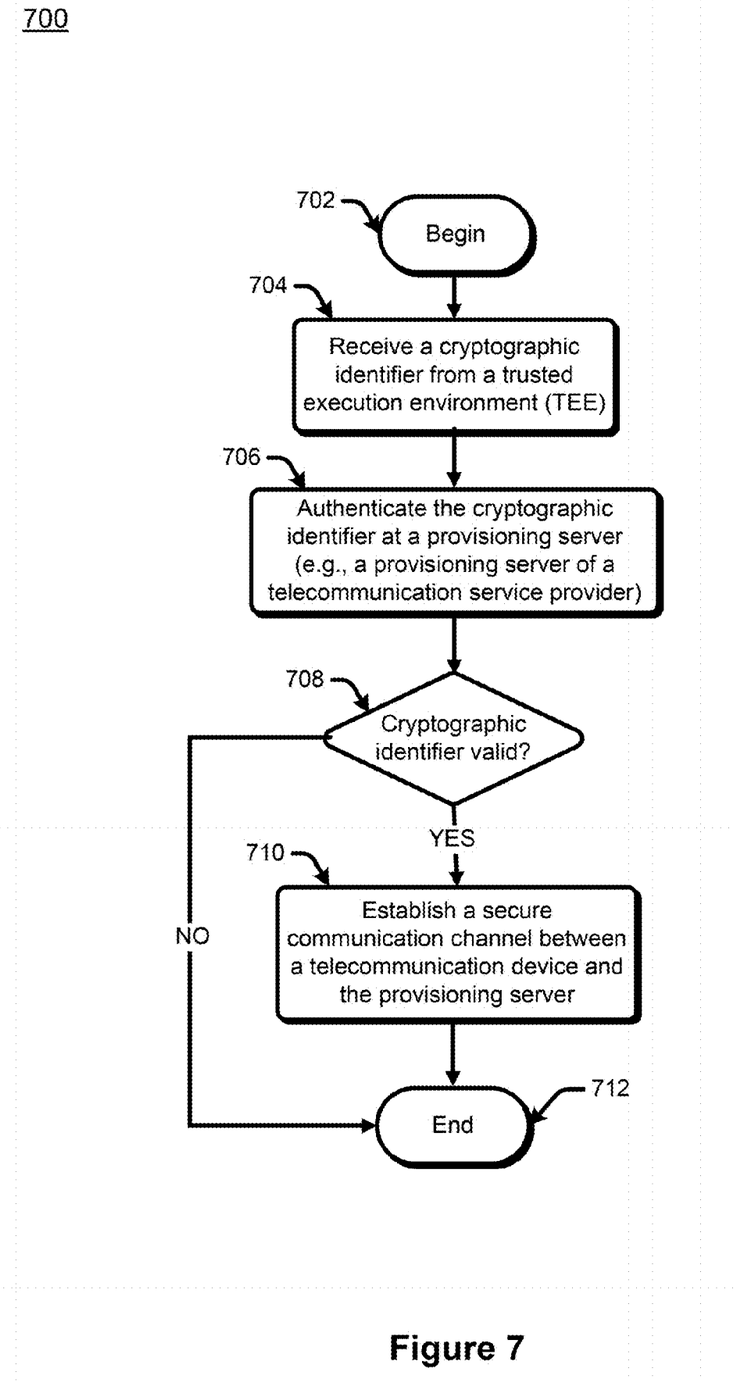
FIG. 7 is a flow chart of an example process for establishing a secure communication connection between a telecommunication device and a provisioning service provider, in accordance with embodiments of the disclosure.

In an embodiment, a secure Trustlet application 320 of the TEE partition 318 may be configured to communicate with the ID module 314 and the network interface 316 components of the user device 302, during various user device 302 authentication processes, described further herein with reference to the flow diagram processes 500, 600, and 700 of FIGS. 5-7. In other implementations, where a user device 202 does not have a TEE partition, analogous procedures may also be carried out by dedicated software that is stored within the memory 206 of the user device 202. In this scenario, the dedicated software may or may not be logically separated from the device OS 210 and the other user device applications 208.

In various implementations, a secure Trustlet application 320 may be configured to compare service identifier or plan type identifier data of the service identifier of the ID module 314 to corresponding device service identifier or device plan type identifier information of the device type ID element 312. A Trustlet application 320 may also be configured to retrieve identifier data from the ID module 314 and/or the device memory 306, in response to various device-side actions and/or provider-side actions, requiring service authentication. These actions, may include, but are not limited to, the following: inserting a new or existing ID module 314 in to a user device 302, resetting and/or powering on the user device 302, attempting or initiating communications with the user device 302, switching access providers and/or serving access points for the user device 302, etc. Further, the identifier retrieval and comparison functions can be carried out during, or in conjunction with, a secure boot process 322 that powers and activates only device 302 hardware necessary for performing identification module OTA provisioning and service authentication OTA, such as the ID module 314 and the network interface 316.

Figure 4:
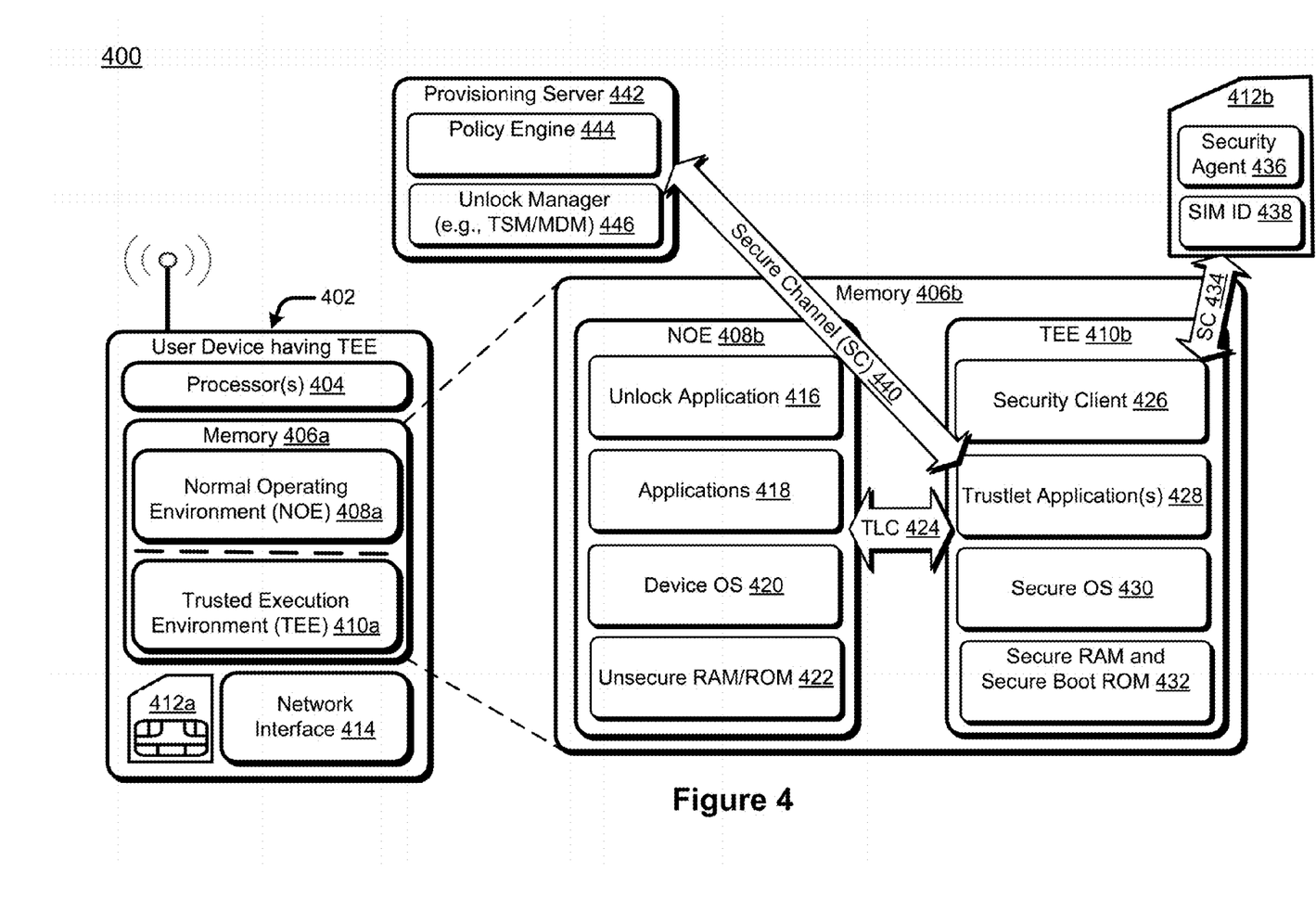
FIG. 4 is an example hardware platform of a user communication device having a trusted execution environment (TEE) component and a normal operating environment (NOE) component, in accordance with embodiments of the disclosure.

FIG. 4 depicts an example hardware platform 400 of a telecommunication device 402 having a trusted execution environment (TEE) component 410a-b and a normal operating environment (NOE) component 408a-b stored in memory 406a-b, in accordance with various embodiments of the disclosure. It should be understood that the techniques described hereafter are directed, at least in part, to use of a secure operating environment by a telecommunications device 402 to control telecommunications device operations while the device is in an unlocked device state. In various implementations, the secure operating environment may refer to the environment derived from the TEE 410a-b, which may correspond to an initial environment that is executed by the telecommunications device 402 following one of a power-on or a reboot operation.

Similar to the telecommunication device 302 depicted in FIG. 3, the telecommunication device 402 of FIG. 4 includes one or more processors 404, a memory 406*a-b* storing a NOE 408*a-b*, a TEE 410*a*, an identity module 412*a-b*, and a network interface 414. Further, in various implementations the TEE 4110*a-b* may employ one or more Trustlet application(s) 428 to determine whether an identity module 412*a-b* (e.g., a SIM card) SIM identification 438 satisfies a security mechanism of the TEE 410*a-b* in association with a corresponding mobile network operator (MNO), represented by the provisioning server 442 of FIG. 4.

In some scenarios, a Trustlet application 428 may enable a device to operate while using different MNO SIM cards 412*a-b*, such as when the Trustlet application 428 determines that the telecommunications device 402 is either permanently or temporarily unlocked. The Trustlet application 428 may also enable a device user to enter a code to either permanently or temporarily unlock the telecommunications device 402. In certain instances, communications between a Trustlet application 428 of a TEE 410*a-b* and an identification module 412*a-b* may be contingent on an authentication process that verifies a cryptographic security identifier (e.g., an asymmetric cryptographic key) associated with the communication between the Trustlet application 418 and the identity module 412*a-b*. Related authentication may also be performed for device hardware, such as a display, a keyboard, or other input/output devices (not shown) of the telecommunications device 402.

In various embodiments, the Trustlet application 428 may receive a remote communication from a provisioning server 442, which provides for either permanent or a temporary unlocking of the telecommunications device 402. The provisioning server 442 may comprise a policy engine 444 (as described above) and an unlock manager component 446 that can issue an unlock command using a specific cryptographic security indicator that is unique to a telecommunications device 402, such as an IMEI code or a unique cryptographic signature or key. In some instances, the provisioning server 442 may perform a batch unlock of multiple telecommunications devices (not shown), by communicating issuing a range of cryptographic security indicators based on various subscriber service attributes (e.g., purchase date, relevant contract date(s), etc.).

In other implementations, the Trustlet application 410*a-b* may receive a remote communication via the provisioning server 442 that disables some functionality of the telecommunications device 402 based on a particular policy of the policy engine 444. For example, the provisioning server 442 may disable use of a specific identity module 412*a-b* because when it is determined to be in violation of the policy. The Trustlet application 410*a-b* can also reject the identity module 412*a-b* during a subsequent reboot of the telecommunications device 402.

In accordance with one or more embodiments, the telecommunications device 402 may include a memory 406*b* having both a NOE 408*b* and a TEE 410*b*, which can be logically separated and distinct from the each other (e.g., by partitioning the memory 406*b* into two different operating environments). For example, the TEE 410*b* may by affiliated with a secure portion of the memory 406*b*, storing a security client 426, various Trustlet applications 428, a secure operating system (OS) 430, and the TEE 410*b* may additionally be associated with a secure RAM and a secure boot ROM 432. In various embodiments, the TEE 406*b* may be inaccessible to non-authenticated devices, peripherals, or other components, including a primary device OS 420, an unlock application 416, and unsecured RAM and/or ROM 422, and various general use software applications 416, which may be respectively associated with the NOE 408*b* portion of the memory 406*b*.

By way of example, the NOE 408*b* may be stored in conventional unsecure memory type, such as flash memory or any other type of modifiable or non-modifiable memory. In accordance with various embodiments, data may be passed between the TEE 410*b* and the NOE 408*b* via a trusted layer connection (TLC) 424, described further herein (e.g., after a secure boot sequence, booting the secure OS 430 of the TEE 410*b*). The different operating environments (the NOE 408*b* and the TEE 410*b*) may be respectively executed by distinct processors (or cores) and/or by shared processors (or cores). For example, in some embodiments, the TEE 410*b* may be accessible only by a specific processor or core having access to the secure RAM/ROM 432, which stores the TEE 410*b*.

In some instances, the telecommunications device 402 may initiate a boot sequence that includes a boot stage that boots the TEE 410*b*, without booting the NOE 408*b*. Accordingly, the TEE 410*b* may operate in conjunction with the secure OS 430, which may enable execution of other trusted applications or Trustlets 428 that are stored in the secure memory 432, and are executable within the TEE 410*b*. Based at least in part on operations performed in the TEE 410*b*, a secure boot sequence may subsequently initiate a separate unsecure boot sequence that initializes the NOE 408*b* to execute the unsecure device OS 420.

In some embodiments, the TEE 410*b* may include any number of Trustlet applications 428, which can be executed by the secure OS 430 within a secure operating environment of the TEE 410*b*. A particular Trustlet application 428 may manage the lock status of the telecommunications device 402. In some scenarios, when the telecommunications device 402 has a "locked" status, the Trustlet 428 can require a SIM identifier 438 of a an identity module 412*b*, read by the telecommunications device 402, to be of a particular type, number, class, or other designation. In some implementations the identity module 412*b* may be associated with a subscriber identity module (SIM) card or a removable memory card that is used to identify a user of the telecommunications device 100 to the provisioning server 442 (associated with a particular MNO).

In some embodiments, a Trustlet application 428 may require the SIM card 412*b* to affiliate with the same MNO as the telecommunications device 402. In some situations, this correspondence can be tracked by the Trustlet application 428, which can in turn notify a corresponding MNO, accordingly. In some implementations, during a secure boot sequence (e.g., where the TEE 410*b* is running, prior to an execution of the NOE 408*b*), the Trustlet application 428 may determine whether or not the SIM card 412*b* is acceptable, such that its SIM ID 438 information (e.g., IMSI data) conforms to a policy of the policy engine 444.

In a scenario where the SIM card 412*b* conforms to the policy engine 444, and the telecommunications device 402 is presently in a locked state, the Trustlet application 428 may allow the booting sequence to initialize an unsecure boot sequence of the NOE 408*b*. In some instances, the Trustlet application 428 may enable a user to enter an access code to enable access to the telecommunications device 402 when a SIM ID 438 of the SIM card 410*b* is deemed to be unacceptable by the Trustlet application 428 and/or when a corresponding cryptographic security identifier associated with the SIM card 410*b* does not directly correspond to a security identifier of the Trustlet 428. Additionally, in some other embodiments, when the telecommunications device 402 is determined to be in an unlocked state, the Trustlet application 428 may identify the unlocked state via a corresponding state log stored in the secure memory 432 of the TEE 410b. Subsequently, the Trustlet application 428 may allow the secure boot sequence to initialize an unsecure boot sequence to execute the device OS 420 of the NOE 408b.

In various implementations, the TEE 410b may include a security client 426 and the SIM card 412b may include a security agent 436. The security client 426 and the s agent 436 may collaborate to perform various cryptographic authentication procedures, such as a two-way or asymmetric authentication, using one or more cryptographic security identifiers/keys that ca authenticate the validity the SIM card 412b and the corresponding Trustlet application 428 to establish secure communications between these affiliated software and/or hardware components. Additionally, this authentication may be performed prior to a time when the Trustlet application 428 accesses the SIM identifier 438. In most instances, this additional level of proprietary device authentication can negate the use of "SIM Shims" or other intermediary software and/or hardware devices, to prevent interference, intervention, or unauthorized tampering with, by a "man in the middle."

In some embodiments, the security client 426 may check or verify the authorization schema with the security agent 436 to verify that the SIM card 412b is still authorized (e.g., not replaced or de-authorized, etc.). Thus, the security client 426 can verify an authenticity of the SIM card 412b during the time period of the booting to (or execution by) the TEE 410b, as well as at other times, such as during operation of the telecommunications device 402 in the NOE 408b. This authorization check may be performed periodically at predetermined intervals, in response to specific events, randomly, on using other MNO designated schedules.

In various embodiments, the TEE 410b may include, or have access to, secure device hardware which may include secure memory 432 to store data for the secure OS 430, the Trustlet application 428, the security client 426, etc. In some scenarios, the secure hardware may also include, but is not limited to, one or more of a display, a keyboard (including input devices such as a touch screen interface, control pads, etc.), a camera, a transceiver, processor(s), etc. In accordance with some implementations, the security client 426 may authenticate some or all of the secure hardware devices (e.g., in cooperation one or more collaborating Trustlet applications 428) to enable use of these authenticated hardware devices within the TEE 410b.

For instance, the security client 426 may conduct an authentication of a secure keyboard component or feature to enable secure data input by a user, providing requisite input to the Trustlet application 428. In some situations, this requisite information may be associated with a device unlock code. In various embodiments, certain unsecure hardware devices may be made inaccessible by the TEE 410b and/or the NOE 408b to prevent compromising a secure state of the TEE 410b. For example, an unsecure transceiver component (not shown) of the telecommunication device 402 may be made inaccessible for use by the TEE 410b, along with other hardware devices, which are not properly authenticated to thwart various user attacks or software and/or hardware hacks.

In various implementations, the memory 422 the NOE 408b and/or the TEE 410b may include any combination of volatile memory and non-volatile memory types (e.g., RAM, ROM, EEPROM, Flash Memory, miniature hard drive, memory card, CD-ROM, digital versatile disks (DVD) or other optical storage, magnetic cassettes, magnetic tape, magnetic disk storage or other magnetic storage devices, or any other medium). Memory can also be described as computer storage media and may include volatile and non-volatile, removable and non-removable media implemented in any method or technology for storage of information, such as computer readable instructions, data structures, program modules, or other data.

In accordance with various embodiments described herein, the TEE 410b may be employed by the telecommunications device 402 to control an ability of the telecommunications device to operate in an unlocked state. The secure operating environment may be an initial environment that is executed by the telecommunications device following a reboot operation. The TEE 410b may employ a Trustlet application 428 to determine whether the SIM card 412b authentication data satisfies a policy associated with the Trustlet application 428, which may correspond to an approved MNO and/or an approve network service provider. The Trustlet application 428 may be configured to allow use of different SIM cards (issued by different MNOs) when the Trustlet application 428 determines that the telecommunications device 402 to be either permanently, or temporarily, unlocked.

FIG. 5 is a flow chart of an example process for establishing a first secure communication connection between a trusted execution environment (TEE) and an identity module, and second secure communication connection between a telecommunication device and a provisioning service provider, in accordance with embodiments of the disclosure. The flow process beings as block 502, such as in response to a device power-on or reboot event. Next, at block 504, a first secure communication channel 434 is established between the SM secure agent 426 of the TEE 410b of a telecommunication device 402 and an identification module (e.g., a SIM card) 412b. In various embodiments, the identification module 412b may be an integral, imbedded component of the telecommunication device 402, or an add-on, non-embedded component of the telecommunication device 402, which can be inserted therein.

Next, at block 506, a service identifier of the identification module 412b, such as IMSI data (e.g., a mobile network code (MNC), a mobile country code (MCC), and/or a group identification (GID)) can be authenticated by a Trustlet application 430 of the TEE 410b. As described above, this service identifier authentication procedure may occur subsequent to a cryptographic authentication of a cryptographic key pair that is shared between the security agent 426 of the TEE 410b and the security client 436 of the identification module 412b. Thereafter, at decision block 508, a determination is made as to whether the corresponding service identifier is valid. In various implementations, a Trustlet application 430 of the TEE 410b may make this validity determination.

In a scenario where the service identifier is determined to be valid, the process proceeds to block 510, where a second secure communication channel 440 is established between the telecommunication device 402 (e.g., via a Trustlet application 430 of the TEE 410b) and the provisioning server 442, which is associated with a particular MNO service to which a user of the telecommunication device is assumed to have subscribed. In this manner, both communications between the TEE 410b and a SIM 412b, as well as between the telecommunication device 402 and a provisioning server 442, can be made secure, thereby preventing unauthorized access during a boot process associated with the secure OS 428 or during a runtime event associated with the device OS 418. Subsequently the process ends at block 514.

Alternatively, when the service identifier is determined NOT to be valid, the process proceeds to block 512, where the telecommunication device 402 may be locked (e.g., via a Trustlet application 430 of the TEE 410b), then a notification of the failed service identifier authentication can be generated and presented at the display of the telecommunication device 402. Then, the flow process ends at block 514

FIG. 6 depicts a flow chart of an example process 600 for establishing a secure communication connection between a trusted execution environment (TEE) and an identity module, in accordance with embodiments of the disclosure. The flow process beings as block 602, such as in response to a device power-on or reboot event. At block 604, a cryptographic key is received (e.g., at the security client of the 406 of the TEE 410b) from the security agent 436 of the identification module 412b (e.g., a SIM card). Next, at block 606, the cryptographic key, which may be associated with an asymmetric (two-way or public/private), cryptographic key is authenticated at the security client of the TEE 410b.

Then, at decision block 608, a determination is made as to whether the cryptographic key is valid. In a scenario, where the cryptographic key received from the security agent 436 is determined to be valid, the flow process proceeds to block 610, where a secure communication channel 434 is established between the TEE 410b and the identification module 412b. Subsequently, the process ends at block 614.

Alternatively, when the cryptographic key received from the security agent 436 is determined NOT to be valid, the flow process proceeds to block 612, where a notification indicating the failed cryptographic authentication is generated and presented at the display of the telecommunication device 402. Then, the flow process ends at block 614.

FIG. 7 depicts a flow chart of an example process for establishing a first secure communication connection between a telecommunication device and a provisioning service provider, in accordance with embodiments of the disclosure. The flow process beings as block 702, such as in response to a device power-on or reboot event. At block 704, a cryptographic identifier is received from the TEE 410b (e.g., at the provisioning server 442) from a trustlet application 430 of the TEE 410b. Next, at block 706, the cryptographic identifier is authenticated at the provisioning server 442 (e.g., via the unlock manager 446 and/or the policy engine 444).

Next, at decision block 708, a determination is made as to whether the cryptographic identifier is valid. In a scenario, where the cryptographic identifier received from the Trustlet application 430 of the TEE 410b is determined to be valid, the flow process proceeds to block 710, where a secure communication channel 440 is established between the telecommunication device 402 and the identification provisioning server 442. Subsequently, the process ends at block 712. Alternatively, in a scenario, where the cryptographic identifier received from the Trustlet application 430 of the TEE 410b is determined NOT to be valid, the flow process ends at block 720. In this situation, the telecommunication device 402 may be locked, or otherwise prevented from receiving services associated with a corresponding MNO that is affiliated with the provisioning server 442.

What is claimed is:

1. A telecommunication device comprising:
one or more processors;
an identification module storing a service identifier; and
a memory coupled to the one or more processors, and having at least a trusted execution environment (TEE) and a normal operating environment (NOE), wherein the TEE is configured to be operated by the one or more processors to:
establish a first secure communication channel between the TEE and the identification module;
authenticate the service identifier of the identification module after the first secure communication channel has been established; and
establish a second secure communication channel between the telecommunication device and a provisioning server of a service provider,
wherein the first secure communication channel or the second secure communication channel is established prior to an execution of the NOE.

2. The telecommunication device of claim 1, wherein the TEE comprises a security agent, wherein the identification module comprises a security client, and wherein the TEE is operable by the one or more processors to establish the first secure communication channel via a cryptographic authentication process.

3. The telecommunication device of claim 2, wherein the cryptographic authentication process is an asymmetric authentication process, whereby the security client communicates with the security agent to validate one or more security keys of the identification module.

4. The telecommunication device of claim 1, wherein the TEE is operable by the one or more processors to establish the second secure communication channel, at least in part, in response to the
i) establishment of the first secure communication channel, or
ii) authentication of the service identifier.

5. The telecommunication device of claim 1, wherein the TEE is operable by the one or more processors to establish the second secure communication channel via a cryptographic authentication process between the service provider and at least one Trustlet application stored in a secure random access memory (RAM) of the TEE.

6. The telecommunication device of claim 1, wherein the either the first secure communication channel or the second secure communication channel is established during a boot sequence of a security-enabled boot application that is stored in a secure read only memory (ROM) of the TEE.

7. A method comprising:
establishing, by a trusted execution environment (TEE) of a telecommunication device, a first secure communication channel between the TEE and an identification module, wherein the identification module is a component of the telecommunication device and the establishing is based on a cryptographic identifier received from the identification module;
authenticating a service identifier of the identification module after the first secure communication channel has been established; and
establishing a second secure communication channel between the telecommunication device and a provisioning server of a service provider,
wherein the first secure communication channel or the second secure communication channel is established prior to an execution of a high level operating system of the telecommunication device.

8. The method of claim 7, wherein the TEE is associated with a secure partition in a memory of the telecommunication device.

9. The method of claim 7, further comprising, prior to establishing the first secure communication channel, authenticating the cryptographic identifier via an asymmetric authentication process that includes validating, at the security client of the TEE, one or more security keys of the identification module.

10. The method of claim 7, wherein the first secure communication channel is established during a secure boot sequence of a secure boot application that is stored in a secure read only memory (ROM) of the TEE.

11. A method comprising:
receiving, at a provisioning server, a cryptographic identifier from a trusted execution environment (TEE) of a telecommunication device, the telecommunication device having established a first secure communication channel between the TEE and an identification module that is a component of the telecommunication device and authenticated a service identifier of the identification module, the service identifier being associated with an operator of the provisioning server;
authenticating the cryptographic identifier received from TEE of the telecommunication device; and
establishing a second secure communication channel between the provisioning server and the telecommunication device, in response to received cryptographic identifier being determined to be valid,
wherein the first secure communication channel or the second secure communication channel is established prior to an execution of a high level operating system of the telecommunication device.

12. The method of claim 11, wherein the cryptographic identifier is associated with at least one Trustlet application that is stored in a secure random access memory (RAM) of the TEE.

13. The method of claim 11, wherein the secure communication channel is established during a secure boot sequence of a secure boot application that is stored in a secure read only memory (ROM) of the TEE.

14. The method of claim 11, wherein the TEE is associated with a secure partition in a memory of the telecommunication device.

15. A non-transitory computer storage device with a stored computer-executable program for execution in a trusted execution environment (TEE) of a telecommunication device by one or more processors of the telecommunication device, which when executed in the TEE by the one or more processors, performs operations, comprising:
establishing a first secure communication channel between the TEE and an identification module, wherein the identification module is a component of the telecommunication device;
authenticating the service identifier of the identification module after the first secure communication channel has been established; and
establishing a second secure communication channel between the telecommunication device and a provisioning server of a service provider,
wherein the first secure communication channel or the second secure communication channel is established prior to an execution of a high level operating system of the telecommunication device.

16. The non-transitory computer storage device of claim 15, wherein the TEE comprises a security agent, wherein the identification module comprises a security client, and wherein the first secure communication channel is established via a cryptographic authentication process.

17. The non-transitory computer storage device of claim 16, wherein the cryptographic authentication process is an asymmetric authentication process, whereby the security client communicates with the security agent to validate one or more security keys of the identification module.

18. The non-transitory computer storage device of claim 15, wherein the second secure communication channel is established, at least in part, in response to the
i) establishment of the first secure communication channel, or
ii) authentication of the service identifier.

19. The non-transitory computer storage device of claim 15, wherein the operations performed by the execution of the computer-executable program, further comprise establishing the second secure communication channel via a cryptographic authentication process between the service provider and at least one Trustlet application stored in a secure random access memory (RAM) of the TEE.

20. The non-transitory computer storage device of claim 15, wherein the operations performed by the execution of the computer-executable program, further comprise establishing either the first secure communication channel or the second secure communication channel during a boot sequence of a security-enabled boot application that is stored in a secure read only memory (ROM) of the TEE.

* * * * *